United States Patent
Langley et al.

[11] 3,891,455
[45] June 24, 1975

[54] PHYTHLOCYANINE PIGMENTS

[75] Inventors: Robert Langley, Newton Mearns; Ronald Barraclough, Paisley, both of England

[73] Assignee: Ciba-Geigy Corporation, Ardsley, N.Y.

[22] Filed: Feb. 26, 1973

[21] Appl. No.: 336,097

[30] Foreign Application Priority Data
Mar. 14, 1972 United Kingdom.............. 11742/72

[52] U.S. Cl.......................... 106/288 Q; 106/308 N
[51] Int. Cl............................................ C08h 17/14
[58] Field of Search........ 106/288 Q, 308 Q, 308 N, 106/308 S

[56] References Cited
UNITED STATES PATENTS

| | | | |
|---|---|---|---|
| 2,861,005 | 11/1958 | Siegel............................. | 106/288 Q |
| 3,749,590 | 7/1973 | Thomas et al................. | 106/288 Q |
| 3,754,958 | 8/1973 | Grambalvo ..................... | 106/288 Q |
| 3,764,360 | 10/1973 | Langley et al.................. | 106/288 Q |

*Primary Examiner*—Winston A. Douglas
*Assistant Examiner*—J. V. Howard
*Attorney, Agent, or Firm*—Vincent J. Cavalieri

[57] ABSTRACT

A process in which a pigment is produced comprising incorporating into a metal phthalocyanine green compound, a minor proportion of a copper phthalocyanine derivative having either the formula: $CuPc(SO_3H)_{3-4}$ II or

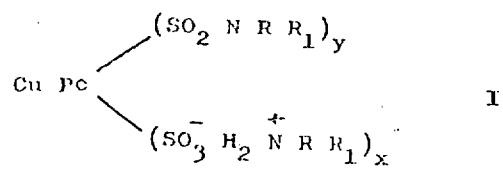

wherein Cu Pc represents a copper phthalocyanine residue, which is halogenated or unhalogenated, R represents a cyclic or acyclic alkyl group having from 1 to 20 carbon atoms, or an aryl group, $R_1$ represents hydrogen, a cyclic or acyclic alkyl group having from 1 to 20 carbon atoms or an aryl group, the alkyl or aryl groups being either unsubstituted or substituted by hydroxyl, amino, alkylamino or amide substituents, and $x$ and $y$ each represent 1, 2 or 3 with the proviso that the sum of $x$ and $y$ is 2, 3 or 4.

12 Claims, No Drawings

PHTHLOCYANINE PIGMENTS

The present invention relates to a new process for the production of phthalocyanine compounds useful as green pigments.

In our copending British Patent Application No. 3330/70, there is described and claimed a process in which a pigment is produced comprising contacting a metal phthalocyanine blue pigment, in dry pigmentary form, with a polar aliphatic solvent which is at least partially water-miscible, and separating the solvent from the treated pigment, in which process there is added to the metal phthalocyanine blue pigment before it is contacted with the solvent, during the contacting, or after it has been separated from the solvent, a minor proportion of a copper phthalocyanine derivative having the formula:

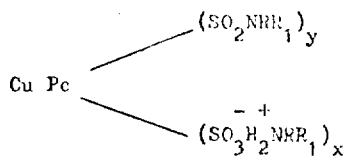

wherein Cu Pc represents the copper phthalocyanine residue, either chlorinated or unchlorinated, R represents a cyclic or acyclic alkyl group having from 1 to 20 carbon atoms or an aryl group, and $R_1$ represents hydrogen or a cyclic or acyclic alkyl group having from 1 to 20 carbon atoms or an aryl group, the alkyl or aryl groups being either unsubstituted or substituted by hydroxyl, amino, alkylamino or amide substituents and $x$ and $y$ each represent 1, 2 or 3 with the proviso that the sum of $x$ and $y$ is 2, 3 or 4.

In a modification of the invention in Application 3330/70 we have now found that by using similar additives on phthalocyanine green as starting material, we obtain green pigments with excellent gloss and transparency in flexographic inks.

Accordingly, the present invention provides a process in which a pigment is produced comprising incorporating into a metal phthalocyanine green compound, a minor proportion of a copper phthalocyanine derivative having either the formula:

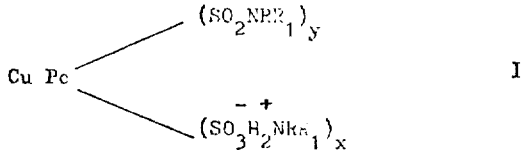

wherein Cu Pc represents the copper phthalocyanine residue, either halogenated, preferably chlorinated, or unhalogenated R represents a cyclic or acyclic alkyl group having from 1 to 20 carbon atoms or an aryl group, $R_1$ represents hydrogen, a cyclic or acyclic alkyl group having from 1 to 20 carbon atoms or an aryl group, the alkyl or aryl groups being either unsubstituted or substituted by hydroxyl, amino, alkylamino or amide substituents, and $x$ and $y$ each represent 1, 2, or 3 with the proviso that the sum of $x$ and $y$ is 2, 3 or 4, or the formula:

$$Cu\ Pc\ (SO_3H)_{3-4}$$

II

The phthalocyanine green compound may be an halogenated copper-, cobalt-, zinc-, cadmium-, nickel- or other transition metal phthalocyanine. Chloro copper phthalocyanine or chloro bromo copper phthalocyanine green respond particularly well to the treatment process of this invention.

If pigmentary green press-cake is used as a starting material in the process, it may be obtained from any suitable source, for instance, by conditioning crude green. Suitable methods of conditioning crude green include solvent treatment with nitrobenzene in the presence of sodium oleate; acid pasting with chlorosulphonic acid; and salt-milling using, for instance, an alkali metal or alkaline earth metal salt of an organic or inorganic acid such as sodium chloride, calcium chloride, sodium sulphate and sodium acetate. If desired the salt milling can be effected in the presence of an organic solvent such as toluene or diethylaniline.

On the other hand, the green metal phthalocyanine compound may be in powder form. In this case, the pigment powder may be treated with a polar aliphatic solvent which is at least partially miscible with water. Examples of suitable solvents are alkanols having from 1 to 4 carbon atoms in the alkyl chain such as methanol, ethanol, n-propanol, iso-propanol and n-butanol; alkyl monocarboxylates having from 1 to 4 carbon atoms in the alkyl chain such as alkyl esters of alkanoic acids, especially ethyl acetate; dialkyl ketones having from 1 to 4 carbon atoms in each alkyl chain such as acetone, methyl ethyl ketone or diethyl ketone; alkoxyalkanols having from 1 to 4 carbon atoms in each of the alkoxy and alkanol components such as 2-methoxyethanol or 2-ethoxyethanol; or alkylene glycols having from 2 to 6 carbon atoms in the alkylene chain such as ethylene glycol or diethylene glycol.

The aliphatic polar solvent may contain dissolved water in a proportion which is insufficient to cause phase separation. Such aqueous solvents include aqueous ethanol (industrial methylated spirits), an azeotropic mixture of ethanol and water or of isopropanol and water, the alkanol being in each case the major component.

The substituents R and $R_1$ of the copper phthalocyanine derivatives of formula I may each represent a cyclic or acyclic alkyl group having from 1 to 20, preferably from 1 to 6, carbon atoms, for example a methyl, ethyl, propyl, butyl, hexyl, cyclohexyl, octyl, decyl, hexadecyl, octadecyl or eicosyl group, but are preferably ethyl groups. Alternatively, one or both of R and $R_1$ may represent an aryl radical, especially a phenyl radical. These alkyl groups may be unsubstituted, but are desirably substituted by one or more, preferably one, substituent which may be an amino group, an alkylamino group preferably one having from 1 to 4 carbon atoms in the alkyl chain, an amide group or most preferably an hydroxyl group.

Of the copper phthalocyanine derivatives of formula I, those derivatives are preferred in which $R_1$ represents hydrogen R represents an alkyl group having from 1 to 6 carbon atoms substituted by a hydroxyl group and in which $x$ and $y$ each represent 2. A particularly preferred derivative of formula I has the formula:

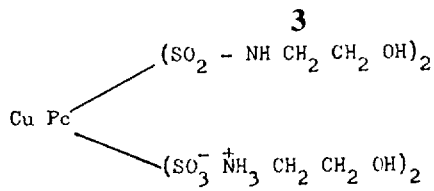

The copper phthalocyanine derivatives of formula I may be produced, for example, by reacting copper phthalocyanine containing $x$ sulphonic acid groups and $y$ sulphonyl chloride groups with from 2 to 4 molecules of an amine $RNHR_1$ wherein $x$, $y$, R and $R_1$ have their previous significance, or with a mixture of such amines.

In addition to the above mentioned nuclear substituents, the copper phthalocyanine compounds of formula I and II may also be halogenated, preferably chlorinated, in the nucleus.

Up to 20% by weight, preferably from 5 to 15% by weight of the copper phthalocyanine compound of formula I or II may be incorporated into the green phthalocyanine compound to be treated.

The copper phthalocyanine compound of formula I or II may be incorporated into the green phthalocyanine compound to be treated by any of a number of techniques. For instance, the copper phthalocyanine compound of formula I or II may be incorporated into the green during any conditioning such as salt-milling of the crude green; before, during or after treatment of the crude or pigmentary green with a solvent; before, during or after halogenation of the crude blue starting material or by precipitation of the copper phthalocyanine of formula I or II on to the green compound to be treated, for instance by the precipitation of the compound of formula II as an amine salt. After incorporation in any of these stages, the compound of formula I or II requires to be precipitated for example by lowering the pH value of the mixture using dilute acid.

Although the degree of improvement in pigmentary properties brought about by the process of the invention depends to some extent on the pigment treated, solvent used and treatment conditions, an increase in gloss and transparency as well as up to about 25% in pigment strength and increased brightness (otherwise known as "clean-ness") of the pigment can be achieved, especially in flexographic liquid ink systems based on polyamide or nitrocellulose.

Some Examples will now be given:

EXAMPLE 1

50g. crude phthalocyanine green (dry weight) as press-cake were added with stirring to 40 ml. 5% aqueous sodium oleate solution, 10 ml. 50% sodium hydroxide solution and 50g. nitrobenzene were then added slowly, followed by a concentrated aqueous solution of 5.0g. of the dyestuff additive having the formula:

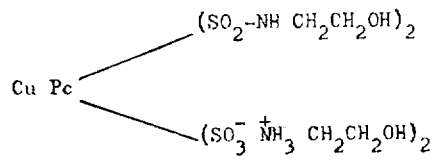

The suspension was heated under reflux conditions for 4 hours and then the nitrobenzene was removed by steam distillation. After lowering the pH of the mixture to below 2 with dilute HCl, the product was isolated by filtration, washing and drying. The product so obtained had good gloss and transparency in nitrocellulose and polyamide inks.

When the procedure described in Example 1 was repeated but using 2.5g. instead of 5.0g. of the dyestuff additive, the product so obtained had similar properties to those described for the product of Example 1, and it was slightly yellower.

EXAMPLE 2

A similar product was obtained when the procedure of Example 1 was repeated using instead of the dyestuff additive of specified formula, a chlorinated product obtained by chlorinating this dyestuff additive in an $AlCl_3$/NaCl melt using sulphuryl chloride as chlorinating agent.

EXAMPLE 3

When the procedure described in Example 1 was repeated but using instead of the dyestuff additive specified by formula therein, 5.0g. of a dyestuff additive of formula Cu Pc $(SO_3H)_{3-4}$, a pigment was obtained having good gloss and transparency in polyamide and nitrocellulose inks.

EXAMPLE 4

50g. copper phthalocyanine green (dry weight) as press-cake, having the approximate composition Cu $Pc.Cl_{14}Br$, were dispersed in 500 ml. of water. A solution of 5g of dye additive of Example 1 dissolved in a small amount of water was then added.

The mixture was stirred vigorously for 30 minutes, the pH of the mixture was then lowered to 1.0–2.0 by the addition of dilute hydrochloric acid and the product isolated by filtration, washing and drying. The product obtained had similar properties to those of the product of Example 1.

EXAMPLE 5

50g. copper phthalocyanine green (dry weight) as press-cake, having the approximate composition Cu $Pc.Cl_{15}$, were dispersed in 500 ml. of water. 5g. of the dyestuff additive of Example 3 in a small amount of water were added. The remaining procedure was the same as that described in Example 4 and gave a product having similar properties to those of the product of Example 1.

Similar results were obtained when calcium chloride or 2.5g. of monoethanolamine dissolved in dilute acetic acid was used instead of hydrochloric acid, in order to precipitate the dyestuff.

EXAMPLE 6

50g. copper phthalocyanine green (dry weight) as press-cake, having the composition Cu $Pc.Cl_{15}$, were dispersed in 500 ml. of water. A solution of 5g. of a dyestuff additive having the approximate formula:

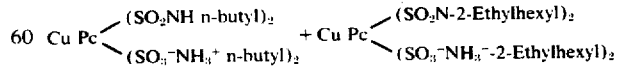

(made by reacting Cu Pc containing two sulphonic acid groups and two sulphonyl chloride groups with a mixture of n-butylamine and 2-Ethylhexylamine), dissolved in a small amount of water was added. The remaining procedure was the same as that described in Example 4 and gave a product having good glass and transparency in polyamide ink.

EXAMPLE 7

50g. copper phthalocyanine green powder, having the composition Cu Pc.Cl$_{15}$, were added to 500 ml. isopropanol containing 13% water. To the pigment slurry there was then added a solution of 5g. of the dyestuff additive of Example 1 dissolved in a small amount of water. After stirring the mixture while heating it under reflux conditions for four hours, 500 ml. of a 25% aqueous sodium chloride solution were added, the isopropanol was removed by distillation and the pH value of the mixture was lowered to 1.0–2.0 with dilute hydrochloric acid. The pigment which was isolated by filtration, washing and drying, had properties similar to those of the product of Example 1.

EXAMPLE 8

25g. crude copper phthalocyanine green, having the composition Cu Pc Cl$_{15}$, 70g. anhydrous calcium chloride and 5g. anhydrous sodium acetate were milled for 6 hours and the mixture was then added to 250 ml. isopropanol containing 13% water. This mixture was heated under reflux conditions for 4 hours, 300 ml. water were added and then the isopropanol was removed by distillation. A solution of 2.5g. of the dyestuff additive of Example 6 in a small amount of water was added and the pH value of the mixture was lowered to 1.0–2.0 by the addition of dilute hydrochloric acid. The product which was isolated by filtration, washing and drying, was found to have properties similar to those of the product of Example 1.

EXAMPLE 9

50g. copper phthalocyanine green, (Cu Pc.Cl$_{15}$) and a solution of 5g. of the dyestuff additive of Example 1 in a small amount of water were added to 500 ml. of isopropanol. After heating this mixture under reflux conditions for four hours, it was cooled to 60°C. and filtered. The press-cake was dried at 60°C. to give a pigment having properties similar to those of the product of Example 1.

EXAMPLE 10

50g. crude unhalogenated copper phthalocyanine blue and 5g. of the dyestuff additive of Example 1 were added to a melt consisting of 550g. aluminum chloride and 122.5g. of sodium chloride maintained at 120°C. 110g. of bromine were added to the melt over 2 hours. The temperature of the melt was then raised to 160°C and held at this temperature for 2 hours. After cooling the melt to 120°C., 165g. chlorosulphonic acid were added over 30 minutes. The temperature of the melt was raised to 160°C. slowly and the melt was then drowned out in 2,500 ml. of water. The crude green product was isolated by filtration and washing.

Fifty dry weight of this crude green press-cake were added to 40 ml. of 5% aqueous sodium oleate solution with stirring. When this mixture had been stirred well, 50g. nitrobenzene were added and the suspension was heated under reflux conditions for four hours. The nitrobenzene was then removed by steam distillation. After lowering the pH value of the mixture to 1.0–2.0, the solid product was isolated by filtration, washing and drying to give a green pigment with good gloss, transparency and flow in nitrocellulose and polyamide inks.

What we claim is:

1. A process for preparing a pigment which comprises incorporating into a metal phthalocyanine green compound, from 5 to 15% by weight of a copper phthalocyanine derivative having either the formula: CuPc-(SO$_3$H)$_{3-4}$    II or

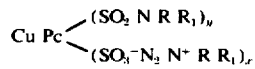

wherein Cu Pc represents a copper phthalocyanine residue, which is halogenated or unhalogenated, R represents a cyclic or acyclic alkyl group having from 1 to 20 carbon atoms, or an aryl group, R$_1$ represents hydrogen, a cyclic or acyclic alkyl group having from 1 to 20 carbon atoms or an aryl group, the alkyl or aryl groups being either unsubstituted or substituted by hydroxyl, amino, alkylamino or amide substituents, and $x$ and $y$ each represent 1, 2 or 3 with the proviso that the sum of $x$ and $y$ is 2, 3 or 4.

2. A process as claimed in claim 1, wherein the phthalocyanine green compound is a chloro- copper or chloro- bromo copper phthalocyanine green, having 12–16 halogen atoms.

3. A process as claimed in claim 1 wherein the phthalocyanine green compound is in the form of press-cake.

4. A process as claimed in claim 3, wherein the press-cake is obtained by conditioning crude green by solvent treatment with nitrobenzene in the presence of sodium oleate, by acid-pasting with chlorosulphonic acid or by salt-milling.

5. A process as claimed in claim 4, wherein the salt-milling is effected using an alkali metal or alkaline earth metal salt of an organic or inorganic acid in the presence of an organic solvent.

6. A process as claimed in claim 5, wherein the organic solvent is toluene or diethylaniline.

7. A process as claimed in claim 1 wherein the green metal phthalocyanine compound is in powder form.

8. A process as claimed in claim 7, wherein the pigment powder is treated with a polar aliphatic solvent which is at least partially miscible with water.

9. A process as claimed in claim 8, wherein the solvent is an alkanol having from 1 to 4 carbon atoms in the alkyl chain.

10. A process as claimed in claim 1, wherein R and R$_1$ are each a cyclic or acyclic alkyl group having from 1 to 8 carbon atoms.

11. A process as claimed in claim 1, wherein the compound of formula I or II is precipitated by lowering the pH value of the mixture using dilute acid.

12. A pigment consisting essentially of the product obtained according to the process of claim 1.

* * * * *